US006578784B1

(12) United States Patent
Lischynski et al.

(10) Patent No.: US 6,578,784 B1
(45) Date of Patent: Jun. 17, 2003

(54) TWINE CUTTING ASSEMBLY FOR BALE PROCESSOR

(75) Inventors: Kimball Lischynski, Saskatoon (CA); Scott Fairburn, Saskatoon (CA)

(73) Assignee: Highline Mfg. Inc., Vonda (CA)

( * ) Notice: Subject to any disclaimer, the term of this patent is extended or adjusted under 35 U.S.C. 154(b) by 148 days.

(21) Appl. No.: 09/638,997

(22) Filed: Aug. 14, 2000

(51) Int. Cl.$^7$ ............................................... B02C 13/02
(52) U.S. Cl. .................... 241/189.1; 241/191; 241/605; 83/907; 83/923
(58) Field of Search ...................... 83/907, 909, 923, 83/924; 241/189.1, 191, 605

(56) References Cited

U.S. PATENT DOCUMENTS

| | | | | |
|---|---|---|---|---|
| 3,641,854 A | * | 2/1972 | Keesling ...................... | 83/175 |
| 4,099,435 A | | 7/1978 | Young .......................... | 83/614 |
| 4,715,175 A | | 12/1987 | Schaible et al. .............. | 56/432 |
| 4,783,892 A | * | 11/1988 | Hergeth ...................... | 29/426.4 |
| 4,823,466 A | * | 4/1989 | Mason ......................... | 30/329 |
| 5,168,786 A | * | 12/1992 | Huggins et al. .............. | 83/308 |
| 5,482,562 A | * | 1/1996 | Abernathy .................... | 134/33 |
| 5,556,041 A | | 9/1996 | Cheesman et al. ....... | 241/24.14 |
| 5,718,157 A | | 2/1998 | Hawley et al. ................ | 83/155 |
| 6,148,521 A | * | 11/2000 | Eslambolchi et al. ........ | 30/90.4 |

FOREIGN PATENT DOCUMENTS

| | | |
|---|---|---|
| CA | 2179121 | 12/1997 |
| CA | 2202014 | 12/1998 |

* cited by examiner

Primary Examiner—Stephen F. Gerrity
Assistant Examiner—Hemant M. Desai
(74) Attorney, Agent, or Firm—Michael Best & Friedrich LLP

(57) ABSTRACT

Disclosed is a twine cutting assembly for a rotary drum type bale processor. The twine cutting assembly comprises a twine cutter and a locking mechanism. The twine cutter, comprising a rod and a cutting member, is adapted to extend through a hole in the side wall of the bale processor. The cutting member may be manually moved axially along the surface of the rotary drum in contact with a guide element. The cutting member has a cutting blade which engages with and cuts any twine wrapped around the rotary drum as the cutting member is moved along the surface of the rotary drum. A locking mechanism including a stop member connected to a handle is positioned within a frame mounted on the exterior of the end wall of the bale processor. The stop is moved between a locked position and an unlocked position by movement of the handle. In the locked position, the stop member extends through a hole in the end wall and engages with the rotary drum thereby preventing rotation of the rotary drum. In this position, the guide element is positioned relative to the hole in the end wall of the bale processor such that contact of the cutting member with the guide element is facilitated. In the unlocked position, the stop member disengages with the rotary drum thereby permitting rotation thereof.

16 Claims, 3 Drawing Sheets

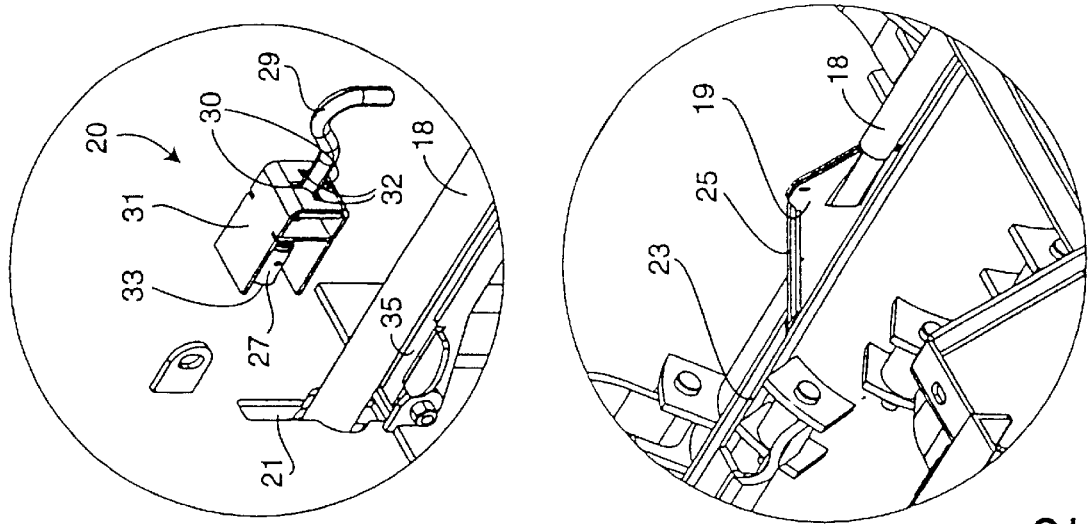
FIG. 3
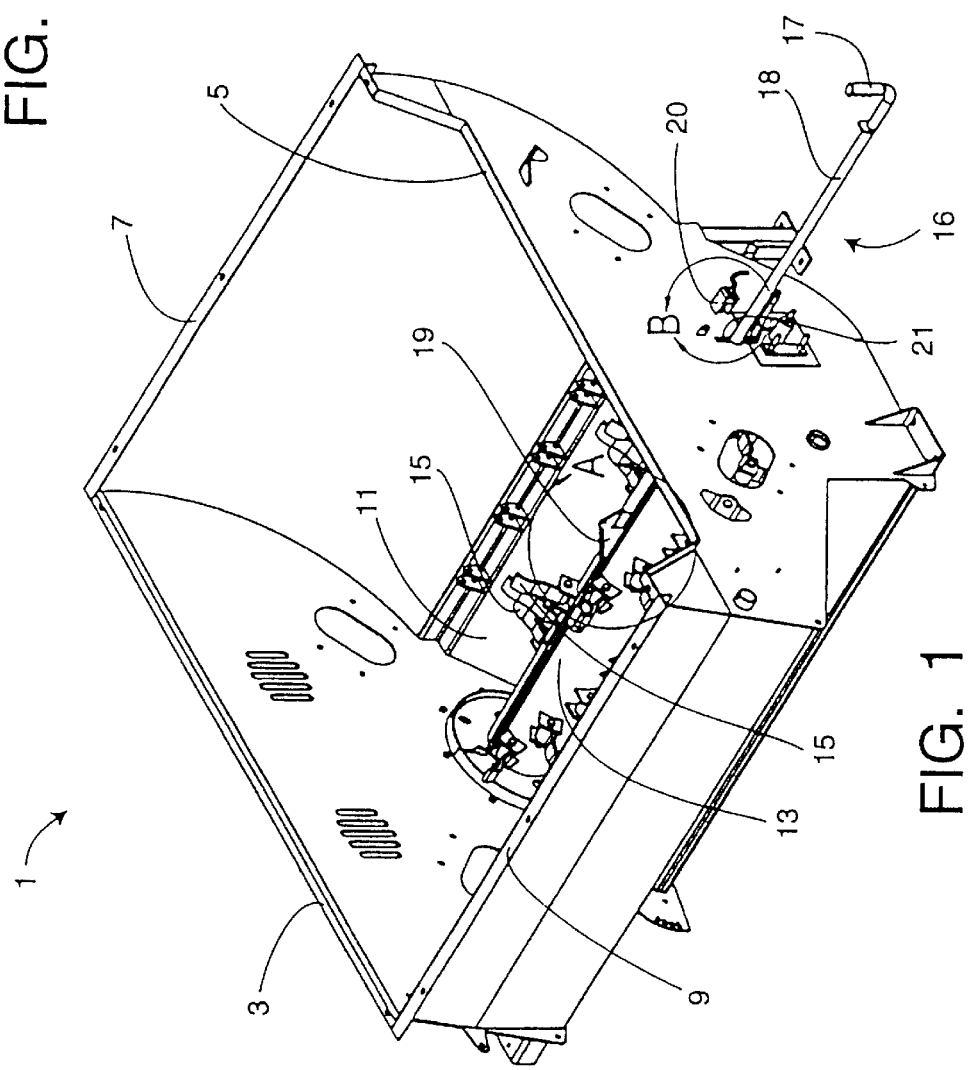
FIG. 2
FIG. 1

TWINE CUTTING ASSEMBLY FOR BALE PROCESSOR

FIELD OF INVENTION

The invention relates to an improved apparatus for cutting twine from the rotary drum of a bale processor.

BACKGROUND

Crop material such as hay, straw and other forage materials are often baled for storage and transportation. When it comes time to use the baled material it is sometimes necessary to disintegrate the material from the bale structure for placing the material into a row of feed, dispensing the material into bunks or spreading the material for use as bedding or the like. The baled material is typically held together by twine which is removed during the disintegration process.

It is known in the art to disintegrate baled material with a bale processor having a rotary drum with flails mounted thereon which act on the baled material when rotated. One such bale processor is disclosed in Canadian Patent No. 2,086,569. The apparatus disclosed in that patent includes a flail drum mounted within a base section of a hopper. Two support rollers are positioned within the hopper and above the flail roller to support and rotate the bale. Mounted on the flail drum are a set of flails which, when the flail drum is rotated, engage with the bale material suspended between the two support rollers thereby disintegrating the baled material. The disintegrated material is ejected through a discharge opening by rotation of the flail drum.

One disadvantage of rotary drum bale processors is that twine used to hold the baled material together often becomes wound around the flail drum. As a result, the action of the flails on the baled material is impeded.

SUMMARY OF INVENTION

It is an object of the invention to attempt to provide an effective manually powered apparatus for cutting twine wrapped around the rotary drum of the disintegrator of a bale processor. According to a broad aspect of the invention, the invention provides a twine cutter including a cutting member mounted at one end of a rigid rod. The twine cutter and at least one of the end walls of the bale processor are configured to facilitate engagement of twine wrapped around the rotary drum by the cutting member across substantially the full length of the rotary drum.

According to another aspect, the invention provides a bale processor comprising a bale receptacle having two end walls, a disintegrator for shredding a bale within the bale receptacle, the disintegrator including a rotary drum mounted along its axis of rotation between the two end walls of the bale processor and a manually powered twine cutter including a cutting member mounted on an elongated rigid rod. The twine cutter and at least one of the end walls of the bale receptacle are configured to facilitate engagement of twine wrapped around the rotary drum by the cutting member across substantially the full length of the rotary drum.

According to a further aspect of the invention, the invention provides a bale processor comprising: a bale receptacle; a disintegrator for shredding a bale within the bale receptacle, the disintegrator including a rotary drum; a twine cutter including a handle and a cutting member; and a guide means for guiding the cutting member across the surface of the rotary drum such that the cutting member engages with and cuts twine wrapped around the rotary drum.

BRIEF DESCRIPTION OF DRAWINGS

Preferred embodiments of the invention will now be described by way of example with reference to the attached drawings in which:

FIG. 1 is a perspective view of a bale processor with a twine cutter assembly according to one embodiment of the invention;

FIG. 2 is a perspective view of the portion of the bale processor shown in FIG. 1 generally indicated by A;

FIG. 3 is a perspective view of the portion of the bale processor shown in FIG. 1 generally indicated by B.

DETAILED DESCRIPTION OF PREFERRED EMBODIMENTS

Figure 4:
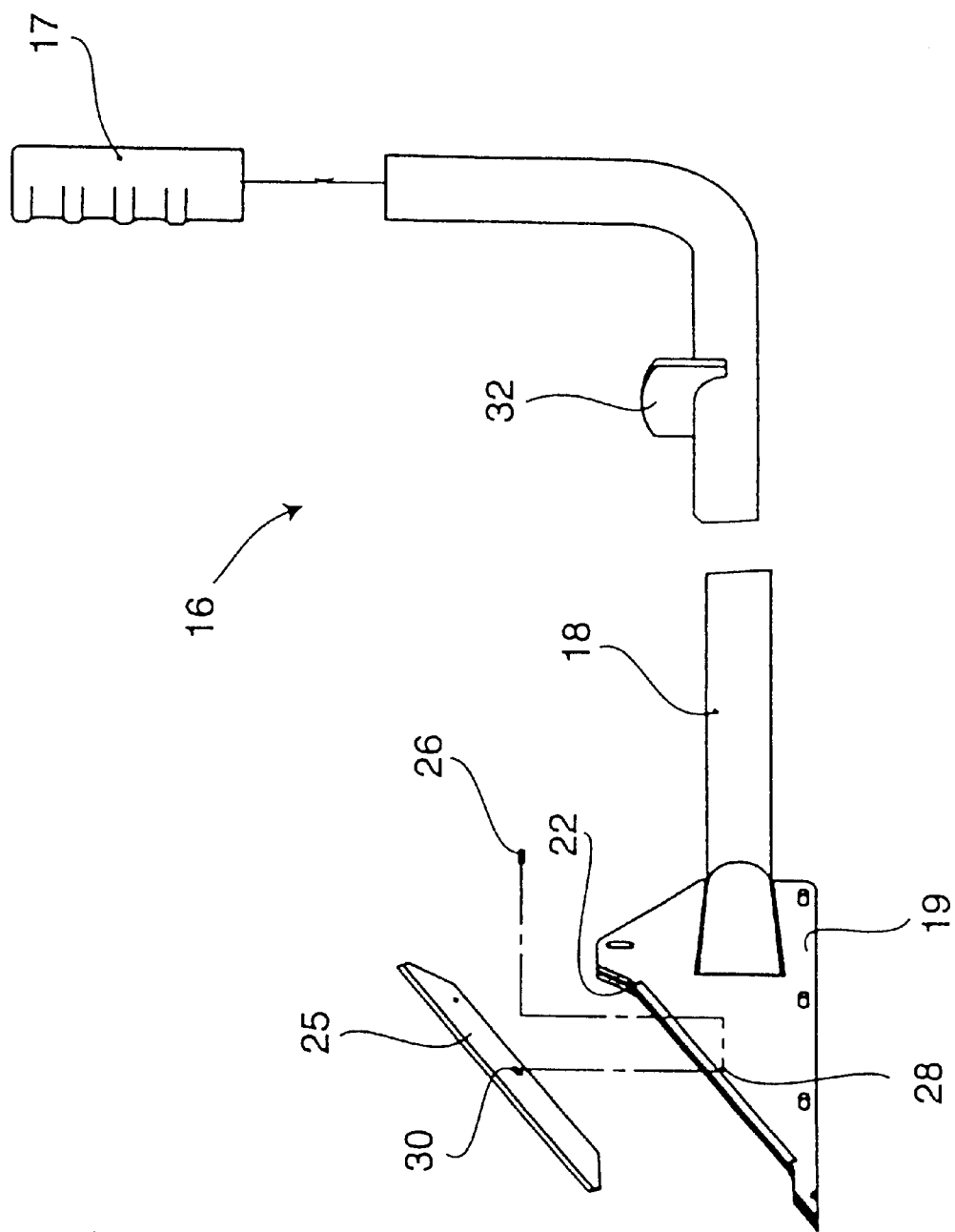
FIG. 4 is an exploded perspective view of a twine cutter according to one embodiment of the invention.

FIG. 1 shows a bale processor with a twine cutter assembly according to one embodiment of the invention. The bale processor includes a hopper 1 having a set of opposing end walls 3 and 5 and a set of opposing side walls 7 and 9 which converge towards a base section 11. A flail drum 13 is mounted along its axis of rotation between the end walls 3 and 5 within the base section 11. The flail drum 13 has a plurality of flails 15 mounted thereon.

A twine cutter 16 extends through a hole 21 in end wall 5 and into the hopper 1. The hole 21 is configured so as to permit the twine cutter 16 to be inserted into and removed from the hole. The twine cutter 16 is moved axially along the surface of the flail drum 13 to cut twine wrapped around the flail drum 13. A locking mechanism 20 for locking the flail drum at a predetermined position is positioned on the end wall 5.

With reference to FIG. 4, the twine cutter 16 includes a handle 17 and a cutting member 19 mounted at opposing ends of a rod 18. Mounted on the leading edge 22 of the cutting member 19 is a cutting blade 25. The cutting blade 25 is secured to the leading edge 22 by a pin 26 which passes through hole 28 in the cutting member 19 and hole 30 in the cutting blade. A cutting stop 32 is mounted on the rod 18.

As shown in FIG. 2, when the twine cutter 16 is inserted into hole 21 in end wall 5, the cutting member 19 is positioned in contact with a guide element in the form of a guide channel 23 on the flail drum 13 which guides the cutting member along the surface of the flail drum 13. The cutting blade 25 mounted on the leading edge 22 of the cutting member 19 engages with and cuts twine (not shown) wrapped around the flail drum 13 as the cutting member is moved along the guide channel 23. The cutting stop 32 is larger than the hole 21 thereby engaging with the end wall 5 to prohibit further insertion of the twine cutter 16 within the hole 21 beyond a predetermined location.

Figure 5:
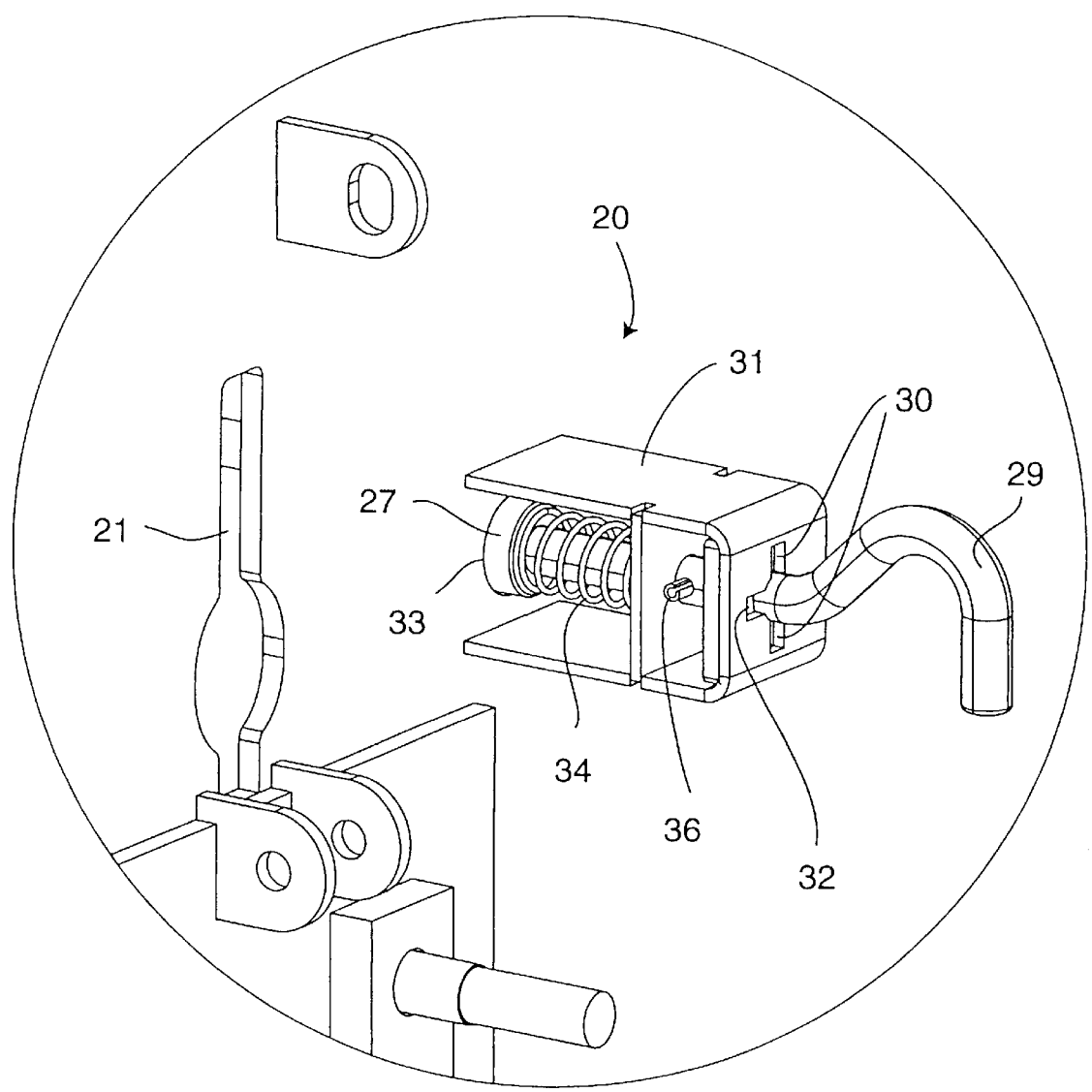
FIG. 5 is a perspective view as shown in FIG. 3 with the locking mechanism in the locked position.

With reference to FIGS. 3 and 5, the locking mechanism 20 includes a stop 27 connected to an end of a handle 29 and positioned within a frame 31 mounted on the outside of the end wall 5. The stop 27 is moved between a locked position shown in FIG. 5 and an unlocked position shown in FIG. 3 by movement of the handle 29. In the locked position, the stop 27 extends through a hole 33 in the end wall 5 and engages with the flail drum 13 thereby preventing rotation of the flail drum. A spring 34 is positioned within the frame 31 so as to force the stop 27 into the locked position. In the locked position, the guide channel 23 is positioned relative to the hole 21 such that when the cutting member 19 is inserted through the hole, the cutting member is positioned within the guide channel 23. A guide extension 35 is positioned on the end wall 5 below the hole 21 to guide cutting member 19 as it is inserted into hole 21.

In the unlocked position, the stop 27 is withdrawn from the hole 33 such that it disengages from the flail drum 13 thereby permitting the flail drum to rotate. The stop 27 is held in its unlocked position by two pins 36 which extend radially from the handle 29. When the stop 27 is withdrawn from the flail drum, the pins pass through two slots 32 in end of the frame 31. The handle is then rotated such that the pins are positioned within two grooves 30 in the frame thereby maintaining the stop 27 in the unlocked position. The stop is returned to the locked position by rotating the handle such that the pins are aligned with and pass through the slots 32. The spring 34 will force the stop 27 into the locked position.

Prior to operating the flail drum 13, the twine cutter 16 is removed from hole 21 such that it does not impede the rotation of the flail drum.

It will be understood by those skilled in the art that the locking mechanism 20 and the flail drum 13 may be configured such that the flail drum can be locked in one of several positions within which one of several channels on the surface of the flail drum 13 is aligned with the hole 21 for receiving the twine cutter 16. Preferably, the channels on the flail drum 13 are positioned at equal intervals over the surface of the flail drum such that the flail drum is balanced when rotated.

It will be understood by those skilled in the art that numerous alterations, modifications and variations to the above embodiments can be made without departing from the substance of the invention.

What is claimed is:

1. A bale processor comprising:
   (a) a bale receptacle having two end walls;
   (b) a disintegrator for shredding a bale within the bale receptacle, the disintegrator including a rotary drum mounted along its axis of rotation between the two end walls of the bale processor; and
   (c) a manually powered twine cutter including a cutting member mounted on an elongated rigid rod;
   wherein said twine cutter and at least one of said end walls of said bale receptacle are configured to facilitate engagement of twine wrapped around the rotary drum by the cutting member across substantially the full length of the rotary drum.

2. An apparatus as claimed in claim further including locking means for locking the rotary drum to prevent rotation thereof when the cutting member is being used.

3. An apparatus as claimed in claim 2 wherein the surface of the rotary drum includes at least one guide element extending axially along the drum that provides a space between the surface of the drum and twine wrapped around the drum facilitating engagement of the twine by the cutting member.

4. An apparatus as claimed in claim 3 wherein said at least one guide element comprises a channel extending axially across the surface of the rotary drum.

5. An apparatus as claimed in claim 4 wherein the rotary drum has more than one channel thereon and the locking means is configured so as to lock the rotary drum such that one of the channels is aligned with the hole in at least one of said end walls of the bale receptacle adapted to receive the cutting member.

6. An apparatus as claimed in claim 5 wherein the channels on the rotary drum are positioned at equal distances around the surface of the rotary drum.

7. An apparatus as claimed in claim 3 wherein the locking means locks at a predetermined position where said at least one guide element is aligned with a hole in at least one of said end walls of the bale receptacle adapted to receive the cutting member.

8. An apparatus as claimed in claim 7 wherein the cutting member has a tapered cutting edge and is mounted to said rigid rod such that the cutting member is aligned with the rod and extends from the end of the rod with a point projecting away from the rod.

9. An apparatus as claimed in claim 7 wherein the locking means comprises:
   (a) a stop member;
   (b) an actuation member for moving the stop member between:
      (i) a locked position wherein the stop member engages with the rotary drum thereby preventing rotation thereof; and
      (ii) an unlocked position wherein the stop member disengages from the rotary drum.

10. An apparatus as claimed in claim 9 wherein the locking means is mounted within a frame on the exterior of a wall of the bale receptacle and, when in the locked position, the stop member extends through a hole in the wall of the bale receptacle and engages with the rotary drum.

11. An apparatus as claimed in claim 10 wherein the locking means further includes:
    (a) biasing means tending to force the stop into the locked position; and
    (b) securing means for securing the stop in the unlocked position.

12. An apparatus as claimed in claim 10 wherein the biasing means comprises a spring positioned between the stop and the frame.

13. A manually powered twine cutter for cutting twine wrapped around the rotary drum of the disintegrator of a bale processor, the rotary drum of the disintegrator being mounted along its axis of rotation between two end walls of the bale processor; the twine cutter comprising a cutting member mounted at one end of a rigid rod; and wherein said twine cutter and at least one of said end walls are configured to facilitate engagement of twine wrapped around the rotary drum by the cutting member across substantially the full length of the rotary drum.

14. An apparatus as claimed in claim 13 wherein said rod includes a handle portion.

15. An apparatus as claimed in claim 14 wherein said handle portion extends radially from said rod at an angle to the longitudinal axis of said rod.

16. An apparatus as claimed in claim 13 wherein said cutting member has a tapered cutting edge and is mounted to said rigid rod such that the cutting member is aligned with the rod and extends from the end of the rod with a point projecting away from the rod.

\* \* \* \* \*

UNITED STATES PATENT AND TRADEMARK OFFICE
CERTIFICATE OF CORRECTION

PATENT NO. : 6,578,784 B1
DATED : June 17, 2003
INVENTOR(S) : Kimball Lischynski and Scott Fairburn It is certified that error appears in the above-identified patent and that said Letters Patent is hereby corrected as shown below:

Column 3,
Line 48, after the word "claim", insert -- 1 --.

Signed and Sealed this

Ninth Day of December, 2003

JAMES E. ROGAN
*Director of the United States Patent and Trademark Office*